(12) United States Patent
Daugherty et al.

(10) Patent No.: US 8,548,442 B2
(45) Date of Patent: Oct. 1, 2013

(54) SYNDICATION OF MULTIPLE SERVICE INSTANCES

(75) Inventors: Brian R. Daugherty, Bellevue, WA (US); David S. Callahan, Issaquah, WA (US); Srivaths B. Copparam, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 697 days.

(21) Appl. No.: 12/685,577

(22) Filed: Jan. 11, 2010

(65) Prior Publication Data

US 2011/0171938 A1    Jul. 14, 2011

(51) Int. Cl.
*H04M 3/42*    (2006.01)

(52) U.S. Cl.
USPC .......... 455/414.1; 455/406; 379/201.12; 379/114.03; 379/121.03; 379/201.03

(58) Field of Classification Search
USPC .......... 379/201.12, 114.03, 114.1, 121.03, 379/201.03; 455/414.1, 406
See application file for complete search history.

(56) References Cited

U.S. PATENT DOCUMENTS

| | | | |
|---|---|---|---|
| 5,657,451 A | | 8/1997 | Khello |
| 7,099,447 B2 | | 8/2006 | McQuilkin |
| 7,986,935 B1 * | | 7/2011 | D'Souza et al. ............. 455/406 |
| 2001/0056354 A1 | | 12/2001 | Feit |
| 2002/0147801 A1 | | 10/2002 | Gullotta et al. |
| 2002/0169876 A1 * | | 11/2002 | Curie et al. .................. 709/226 |
| 2002/0194076 A1 | | 12/2002 | Williams |
| 2004/0024688 A1 | | 2/2004 | Bi |
| 2005/0256970 A1 | | 11/2005 | Harrison et al. |
| 2006/0015617 A1 | | 1/2006 | Castro |
| 2006/0020525 A1 | | 1/2006 | Borelli et al. |
| 2006/0075102 A1 | | 4/2006 | Cupit |
| 2008/0304644 A1 * | | 12/2008 | Mishra et al. ............. 379/201.12 |

OTHER PUBLICATIONS

International Search Report and Written Opinion, corresponding International Application No. PCT/US2010/062644, Sep. 27, 2011, 9 pages.

Uttamchandani et al., "BRAHMA: Planning Tool for Providing Storage Management as a Service," http://citeseerx.ist.psu.edu/viewdoc/download?doi=10.1.1.92.5820&rep=rep1&type=pdf, 10 pages, Jul. 2007.

Spreedly, "Subscribers with Multiple Subscriptions?" <http://getsatisfaction.com/spreedly/topics/subscribers_with_multiple_subscriptions>, 1 page (accessed Nov. 19, 2009).

* cited by examiner

*Primary Examiner* — Kwasi Karikari
(74) *Attorney, Agent, or Firm* — Klarquist Sparkman, LLP (57) ABSTRACT

Service provisioning tasks can be performed to provision or deprovision services for users, reconcile overlapping services, and apply effective service properties. A service can be provisioned by receiving a request to provision the service for a user, reconciling new service properties with current service properties, from one or more service instances, to determine effective service properties, and applying the effective service properties as properties to use for the service for the user. A service can also be provisioned by receiving a request to provision the service for a user, storing a new service instance, and reconciling the new service instance with one or more previously stored service instances for the same service to determine effective service properties. A service provisioning system can perform provisioning operations for one or more internal and external service providers.

18 Claims, 8 Drawing Sheets

| Offer Action | Initial User State | Service Action | Property Action | |
|---|---|---|---|---|
| Provision | No service instance | Add service for user | New properties | ← 310 |
| Provision | Single overlapping service instance | None | Reconcile service properties | ← 320 |
| Provision | Multiple overlapping service instances | None | Reconcile service properties | ← 330 |
| Deprovision | No service instance | None | None | ← 340 |
| Deprovision | Single overlapping service instance | Remove service for user | Remove properties | ← 350 |
| Deprovision | Multiple overlapping service instances | None | Reconcile service properties | ← 360 |

SYNDICATION OF MULTIPLE SERVICE INSTANCES

BACKGROUND

With the increasing popularity of online service subscriptions, there is a need for managing service subscriptions, particularly when a user is subscribed to multiple offers from the same, or from different, service providers.

When a user is subscribed to a single offer from a single service provider, provisioning and management of the service subscription is relatively straightforward. The service provider keeps track of the offer, the services that make up the offer, service specific properties, and the user information. The user is provisioned to use the services of the offer. When the user decides to cancel the offer, the provisioned services of the offer are deprovisioned by the service provider.

However, when a user wants to subscribe to multiple offers from a single service provider (or from different service providers), and the offers include overlapping services, then the tasks of provisioning, deprovisioning, and managing of the subscription can be more difficult. One solution might be for the user to create a new user account for each offer the user subscribes to. However, keeping track of multiple user accounts can be difficult and confusing for the user, as well as less efficient for the service provider (or service providers).

Therefore, there exists ample opportunity for improvement in technologies related to provisioning of services and the reconciliation of multiple service subscriptions.

SUMMARY

In summary, the detailed description is directed to various techniques and solutions for service provisioning, including reconciling service properties for overlapping services.

According to one aspect of the techniques and solutions described herein, a method for provisioning services for users comprises receiving a provisioning request, wherein the provisioning request comprises a request to provision a service, represented by a service identifier, for a user, represented by a user identifier, and where the provisioning request further comprises new service properties for the service. The method further comprises reconciling the new service properties for the service with current service properties for the service, where the reconciling comprises obtaining the current service properties for one or more previously provisioned instances of the service for the user, and based on the obtained current service properties and the new service properties, determining effective service properties for the service. The method can further comprise applying the effective service properties as properties to use for the service for the user. The method can be implemented, at least in part, by a service provisioning system.

According to another aspect of the techniques and solutions described herein, a method for provisioning services for users comprises receiving a provisioning request to provision a service for a user, storing a new service instance representing the provisioning request, and reconciling the new service instance with one or more previously stored service instances for the same service to determine effective service properties, where a plurality of the new and previously stored service instances comprise a same service property with different property values. The service instance can comprise a user identifier, a service identifier, and service properties for the service. The method can be implemented, at least in part, by a service provisioning system.

According to yet another aspect of the techniques and solutions described herein, a service provisioning system for provisioning services for users comprises computing devices and data repositories, where the computing devices are configured for performing service provisioning operations including receiving provisioning requests, reconciling service properties (e.g., among one or more service instances) to determine effective service properties, and applying effective service properties.

The described techniques and tools for solutions for service provisioning, including reconciling multiple service instances, can be implemented separately or in combination.

DETAILED DESCRIPTION

The following description is directed to techniques and solutions for service provisioning, including reconciling service properties for overlapping services. The various techniques and solutions can be used in combination or independently. Different embodiments can implement one or more of the described techniques and solutions.

I. Example Provisioning of Services

Various techniques and solutions for service provisioning are described herein. Provisioning tasks (e.g., tasks to provision a service, deprovision a service, or manage a service subscription or instance, etc.) can be performed for any type of service (e.g., computing-related services). For example, services can include webmail services, application services (e.g., on-line word processing applications, spreadsheet applications, and the like), website services, online file storage services, online education account services, gaming services, phone (e.g., mobile phone) services, etc. In addition, services other than computing-related services can be provisioned using the techniques and solutions described herein.

Services can be provisioned independently or as part of an offer. An offer (e.g., a go-to-market offer, or a subscription) can be an offer for one or more services. For example, an offer can include a package of related services (e.g., a collection of business-related application services).

A user (subscriber) can subscribe to a single service or to multiple services. A user can subscribe to services individually or as part of an offer (which may include multiple related services). If a user subscribes to a single service, provisioning of the service for the user can include storing the service instance and applying the service properties.

Provisioning of services for a user can be more difficult when multiple offers overlap in the services they include (or if a user subscribes to different variations of the same service with different properties), especially if they differ in the properties included for the service across the different offers. An example is provisioning a mailbox for a user, which is a common service that might be included in many offers (or subscriptions). One offer may include a 5 gigabyte inbox storage limit, while another offer may include a 20 gigabyte inbox storage limit. In order to determine which storage limit the use will receive (e.g., a 5 gigabyte inbox or a 20 gigabyte inbox), the service properties can be reconciled across the different instances of the service that have been provisioned for the user.

The various provisioning techniques and solutions described herein can be applied to provision the user correctly when different provisioning (and deprovisioning) situations are encountered. For example, the techniques and solutions described herein can be applied to provision a service for the user on the first subscription, update the properties appropriately when other subscriptions are purchased or removed, and ensure that a service provisioned for a user is not completely removed until the user has no remaining subscriptions that include that service for the user (when there are no remaining service instances for the service for the user).

II. Example Service Provisioning Environment

The various techniques and solutions for service provisioning can be implemented in a service provisioning environment. For example, a service provisioning environment can manage service provisioning tasks (e.g., storage, provisioning, and deprovisioning of services) for a number of internal and/or external service providers.

Figure 1:
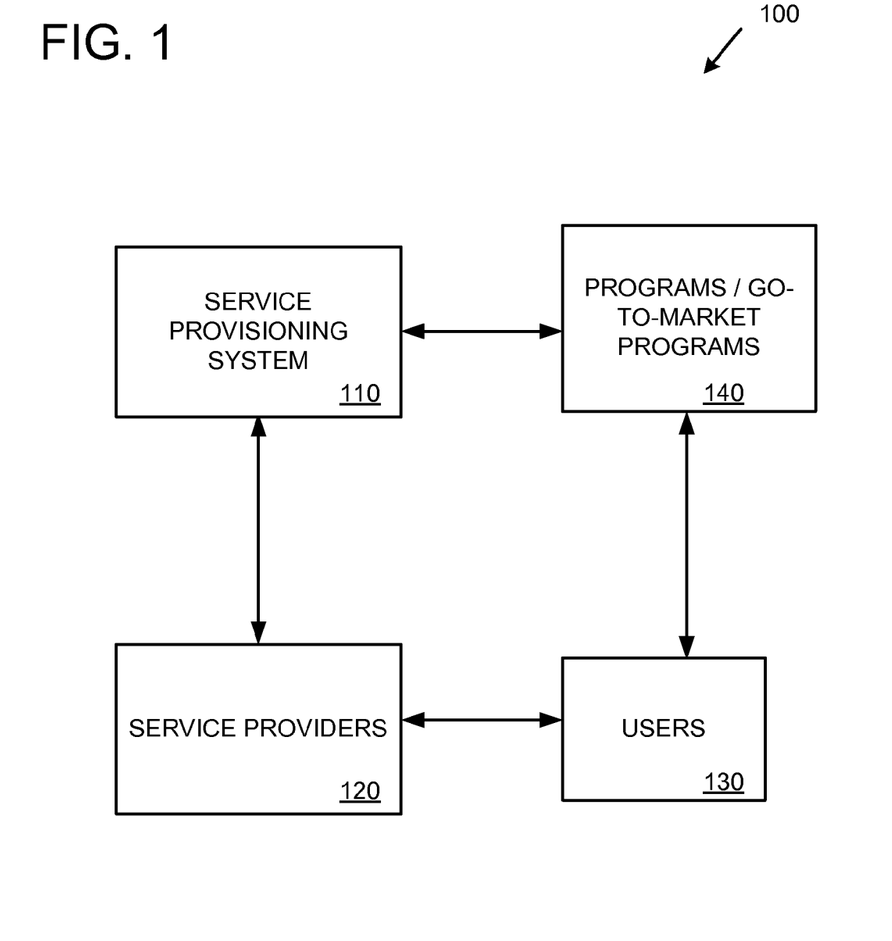
FIG. 1 is a diagram showing an exemplary environment for provisioning services and reconciling service properties.

FIG. 1 shows an example environment 100 for provisioning services and reconciling service properties. In the service provisioning environment 100, a service provisioning system 110 performs provisioning tasks for service providers 120. The service providers 120 provide services for their respective users 130.

The service provisioning system 110 can include various computing devices (e.g., computer servers, database servers, etc.), business rules and business logic, and other hardware and/or software for performing service provisioning tasks. In the example environment 100, the service provisioning system 110 performs service provisioning tasks. These tasks include receiving and responding to requests from the service providers 120 (e.g., request to provision services for users, requests to deprovision services for users, and requests for information for services and/or users, such as the effective service properties for specific services/users). The service provisioning system 110 also responds to requests from programs/go-to-market programs 140 (e.g., subscriber programs, storefronts, resellers, and the like), such as requests to provision services for users and requests to deprovision services for users. Examples of programs are the Office Live program, the Live@edu program, Windows Mobile Marketplace (all provided by Microsoft Corporation), and Amazon.com (provided by Amazon.com, Inc.). Programs 140 can be entities through which consumers purchase services (or offers), such as a storefront (e.g., a web-based storefront). For example, using programs 140, a user may purchase a service subscription, upgrade/downgrade a service subscription, cancel service, etc.

For example, the service provisioning system 110 can receive a provisioning request from the Live@edu program (e.g., one of the programs 140) to provision a specific user for a webmail account. In response to the request from the Live@edu program, the service provisioning system 110 can send a request to the service provider of the webmail system (e.g., one of the service providers 120) to add the webmail account for the user with specific service properties (if this is the first instance of the service for the user) or to update the webmail account for the user with effective service properties (if the user has multiple instances of the service).

The service provisioning system 110 also stores provisioning information, such as offer and/or service data and provisioning state data (e.g., stored in a provisioning database). Furthermore, the provisioning system 110 manages changes in provisioning state and takes appropriate action (e.g., reconciliation of service properties, determination of effective service properties, etc.).

The service providers 120 can be internal or external service providers. Internal service providers are those service providers that are related to the service provisioning system 110 (e.g., they are operated by the same company or organization). External service providers are unrelated service providers (e.g., third party service providers) that use the service provisioning system 110 (e.g., they have an agreement with the company operating the service provisioning system). The service providers 120 can communicate with the service provisioning system 110 via a network (e.g., a local area network, a wide area network, or the Internet).

The programs 140 can use the service provisioning system 110 to perform service provisioning tasks. For example, the programs 140 can send a provisioning request (e.g., to provision or deprovision a service for a user) to the service provisioning system 110. The provisioning request can be sent using an application programming interface (API) provided by the service provisioning system 110. In response to the service provisioning request, the service providers can receive information regarding effective service properties to use for a specific user or users.

The users 130 are the subscribers to the services provided by the service providers 120. The users 130 also communicate with the programs 140 (e.g., to purchase a service subscription, upgrade/downgrade a service subscription, cancel service, etc.).

III. Example Provisioning Information

Various types of information can be used to provision services for users. For example, an offer (e.g., a go-to-market offer) can be provided by a service provider. An example of an offer is an offer for a webmail account provided by an Internet service provider. An offer can be an offer for a single service or an offer for multiple services (e.g., a package or collection of related services).

Provisioning information can include information identifying an offer (e.g., identified by an offer name or identifier) to which a user is subscribing. The offer can include information about the services included in the offer.

Provisioning information can also include information identifying the service (such as a service name or identifier) and other information about the service, such as service properties. Service properties describe the attributes or details of the service. For example, service properties for a webmail service can include mailbox size, expiration information, and authorized devices.

In a specific implementation, each service property is associated with a relative weight. The weight is a value which can be used to compare the same property across multiple instances of the provisioned service to determine which property represents the better level of service. For example, if one instance of a webmail service includes an inbox (a service property) with a 5 GB size (a value of the inbox property) and a weight of 25, and another instance of the webmail service includes an inbox with a 10 GB size and a weight of 35, then the two instances of the property can be compared based on their respective weights. In this example, when the inbox property is reconciled across the two instances of the inbox service, the weights (25 and 35) are compared to determine that the service instance with the 10 GB inbox size provides the better level of service (the weight of 35 is greater than the weight of 25). In other implementations, different types of service level indication can be used, so long as the properties can be compared across multiple instances to determine which provides the better (or more desirable) level of service. In a specific implementation, relative weights in the range of 0 to 100 are used.

Provisioning information can also include information identifying the user (e.g., identified by a user name or identifier) for which the service (or services) are to be provisioned.

Provisioning information can be stored (e.g., in a database) in the form of a service instance. In a specific implementation, a service instance represents a specific provisioned service (including service properties) for a specific user, and may also include offer information (e.g., a specific offer identifier).

IV. Example Provisioning Information Schema

This section describes a specific implementation of a data schema used to define provisioning information. However, in general, any data schema that describes services and service properties could be used to implement the techniques and solutions for service provisioning described herein.

In the specific implementation, offer data includes provisioning information describing offers and services. An offer includes the following information:
 Offer ID (unique identifier for the offer)
 List of Services (a list of one or more Service IDs included in the offer)
 List of Service Properties (name, value, and weight properties of each service)
A service includes the following information:
 Service ID (unique identifier for the service)
 Service Name (descriptive name for the service)
Using the offer and service schema defined above, the following is a list of sample offer/service data.
 WebmailGoldOffer
  Service100 [Inbox=20 GB Weight=100, Expire=Never Weight=100]
  Service300 [Property=value Weight=50]
 WebmailSilverOffer
  Service100 [Inbox=10 GB Weight=60, Expire=1 Year Weight=40]
 WebmailThreeDeviceOffer
  Service100 [Inbox=10 GB Weight=60, Expire=1 Year Weight=40,
  DeviceList=PC+Phone+TV Weight=100]
 WebmailPhonePCOffer
  Service100 [Inbox=10 GB Weight=60, Expire=1 Year Weight=40,
  DeviceList=Phone+PC Weight=40]
 WebmailPhoneOnlyOffer
  Service100 [Inbox=10 GB Weight=60, Expire=1 Year Weight=40,
  DeviceList=Phone Best=20]
 WebmailSeparate
  Service100 [Inbox=5 GB Weight=40, Expire=1 Year Weight=40]

In the sample offer data above, the WebmailGoldOffer offer includes two services, Service100 and Service300. The first service, with a Service ID of Service100, has a number of properties. Specifically, Service100 has an inbox property with a value of "20 GB" and a weight of 100, and an expire property with a value of "Never" and a weight of 100. Other offers also include the service Service100, but with different properties. For example, the WebmailSilverOffer offer also includes Service100, but with a 10 GB inbox and a 1 Year expiration.

Services can also be provisioned outside of an offer. In the sample data above, the WebmailSeparate offer indicates that a user subscription to the Service100 without subscribing to a particular offer.

Using the offer and service schema defined above, the following is a list of sample service data.
 Service100 WebmailInboxService
 Service300 AnotherService In the sample service data above, Service ID is associated with a service name. For example, the Service100 service is associated with the name "WebmailInboxService."

In the specific implementation, provisioning state data includes an association between a user, an offer, and a service.
 User ID (unique identifier for the user)
 Offer ID (unique identifier for the offer)
 Service ID (unique identifier for the service)
Using the provisioning state schema, the following is a list of sample provisioning state data.
 User1234, WebmailGoldOffer, Service100
 User1234, WebmailThreeDeviceOffer, Service100
 User5678, WebmailSilverOffer, Service100

As the above sample data illustrates, a specific user (subscriber) can be associated with a number of provisioned service instances. For example, User1234 is associated with two service instances (an overlapping service), each with different service properties for the Service100 webmail service.

V. Example Provisioning State

In some implementations, provisioning state is tracked (or determined) in order to decide which tasks need to be performed. In general, provisioning state indicates a present state for a user with respect to a particular service and/or offer, an action to be performed (e.g., provision or deprovision a service and/or offer), and resulting tasks that need to be performed (e.g., service actions and/or property actions).

For example, a provisioning state for a user with respect to a particular mailbox service could indicate that one or more service instances of the mailbox service have already been provisioned for the user. In such a case, if a new provisioning action is to be performed to provision another instance of the mailbox service for the user, then the provisioning state can indicate that a property action needs to be performed to reconcile service properties among the service instances.

Figure 3:
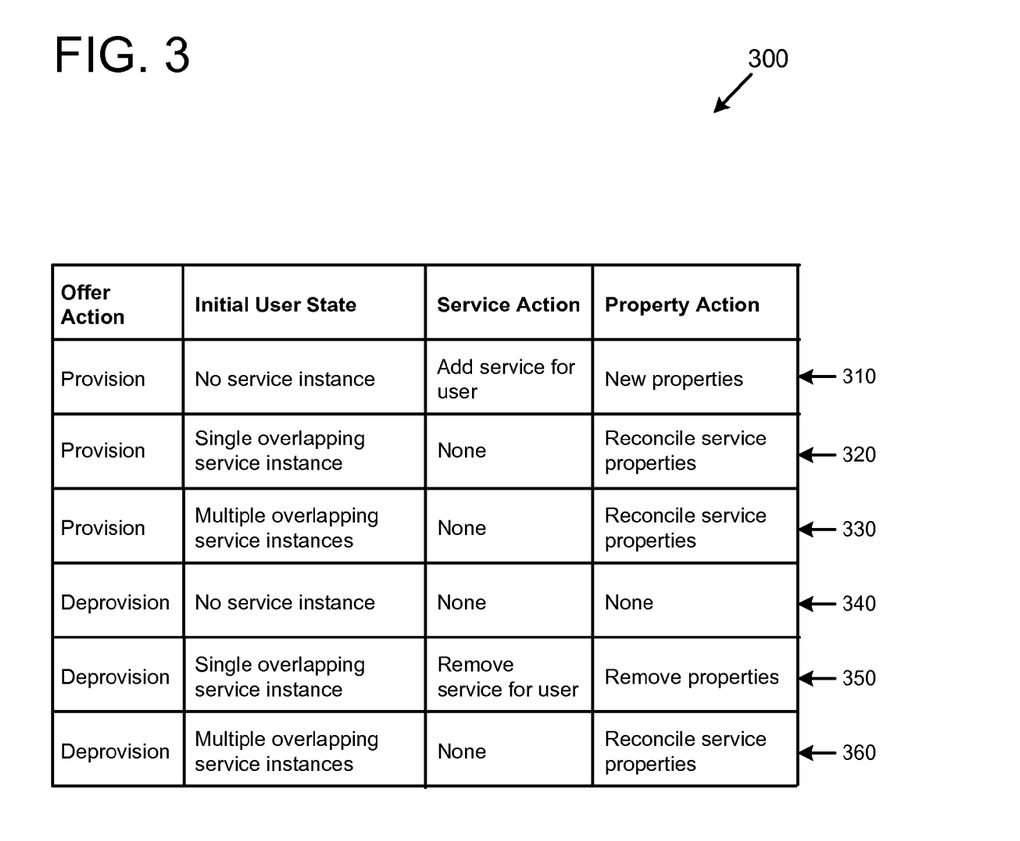
FIG. 3 is an exemplary provisioning state diagram.

FIG. 3 is an example provisioning state diagram 300. The example provisioning state diagram 300 indicates provisioning state and the appropriate tasks and actions to perform when changing state.

There are four columns in the provisioning state diagram 300. The first column, "Offer Action," refers to the requested action (e.g., a request to provision or deprovision an offer and/or a service for a user).

The second column, "Initial User State," refers to the current provisioning state of the service for the user. For example, the initial user state can indicate that no instances of the service have yet been provisioned for the user (e.g., that the user is not currently subscribed to the service). The initial user state can also indicate that one instance of the same service has already been provisioned for the user, or that multiple instances of the same service have already been provisioned for the user (that the user has been provisioned with an overlapping service).

The third column, "Service Action," refers to the action to be performed. In some situations, no action needs to be performed. In other situations, the service is added (e.g., if this is the first time the service is being provisioned for the user). In yet other situations, the service is be removed (e.g., if the user does not have any instances remaining for the service).

The fourth column, "Property Action," refers to the action to be performed with respect to the service properties. In some situations, new properties are added. In other situations, properties are reconciled. In yet other situations, properties are removed.

In the example provisioning state diagram 300, the first row 310 indicates what tasks and actions are performed when receiving a request to provision a service (a provisioning request) when the service is not currently provisioned for the user (when the initial user state indicates that there are no current service instances for the user). In this situation, the service will be added for the user (the Service Action) and new service properties will be stored (the Property Action). This can result in a new service instance (indicating the service, including service properties, has been provisioned for the user) being stored (e.g., in a provisioning state database).

For example, if a user is subscribing to the WebmailSilverOffer offer (see Section IV above), which includes the Service100 webmail service, and the user currently has no instances of Service100 provisioned, then this state (row 310) would apply. The webmail service (Service100) would be added for the user (e.g., the service provider of the webmail service would allocate, or enable, the user's webmail account) with the service properties indicated by the service (in this case, a 10 GB inbox and a one year expiration). The service instance could then be stored (in this case, the service instance could include the offer identifier, service identifier, user identifier, and service properties). The effective service properties (in this case, the properties of the one instance) could also be stored and/or sent to the service provider to use when providing the service for the user.

A user could also subscribe to the Service100 webmail service outside of any offer. For example, the user could directly subscribe to the Service100 webmail service, including specific service properties (e.g., a 5 GB inbox with a one year expiration). The service instance could then be stored (in this case, the service instance could include the service identifier, user identifier, and service properties). The service instance could also include an indication that the instance is not related to an offer.

In the example provisioning state diagram 300, the second row 320 indicates what tasks and actions are performed when receiving a request to provision a service (a provisioning request) when one instance of the service is currently provisioned for the user (when the initial user state indicates that there is one current service instances for the user). In this situation with an overlapping service, the service does not have to be added for the user (the Service Action) because the user is already subscribed to the service, and service properties will be reconciled (the Property Action). The reconciling will be performed for the properties of the new service provisioning request and the properties of the current (existing) instance of the service. The reconciling is performed to determine the effective service properties to be used for the service (those properties values that represent the best, or desired, level of service across the instances). The effective service properties will be applied to the service, and can also be stored. Also, a new service instance will be stored for the new provisioning request (indicating the service, service properties, and user).

For example, if a user is subscribing to the WebmailSilverOffer offer (see Section IV above), which includes the Service100 webmail service, and the user had previously subscribed to the Service100 webmail service (e.g., WebmailSeparate, not part of an offer, or another offer which also included the Service100 service) and thus had one instance of Service100 provisioned, then this state (row 320) would apply. There would be no service action because the user already subscribes to the Service100 webmail service. However, service properties would be reconciled to ensure that the user receives the best level of service across the service instances. Using the example of a request to provision WebmailSilverOffer with an existing instance of WebmailSeparate, the reconciling would compare the inbox property (an overlapping service property because the inbox property occurs in both instances of the service) using the weights (the 10 GB inbox property value with a weight of 60 compared to the 5 GB inbox property value with a weight of 40) to determine an effective inbox property value (in this case, 10 GB would be the effective inbox property value). Similarly the expiration property would be compared. The resulting effective property values would then be applied to the webmail service for the user (the user would receive a 10 GB inbox with a one year service expiration). For example, the effective service properties could be sent to the service provider to use when providing the user the webmail service. The effective service properties could also be saved (e.g., in a database at the service provisioning system and/or in a database at the service provider).

In some situations, updating (or sending) effective service properties to the service provider can be skipped. For example, if the new service instance does not include properties with better (or more desirable) values than existing instance(s), then effective properties do not have to be sent as they would be the same as the ones currently in use (e.g., this could occur if the user has a 10 GB inbox currently provisioned and the new instance is for a 5 GB inbox).

In the example provisioning state diagram 300, the third row 330 indicates what tasks and actions are performed when receiving a request to provision a service (a provisioning request) when multiple instance of the service is currently provisioned for the user (when the initial user state indicates that there are two or more current service instances for the user). In this situation, the service does not have to be added for the user (the Service Action) because the user is already subscribed to the service, and service properties will be reconciled (the Property Action). The reconciling will be performed for the properties of the new service provisioning request and the properties of the current (existing) instances of the service. The reconciling is performed to determine the effective service properties to be used for the service (those properties values that represent the best level of service across the instances). The effective service properties will be applied to the service, and can also be stored. Also, a new service instance will be stored for the new provisioning request (indicating the service, service properties, and user).

The tasks and actions performed in row 330 are essentially the same as performed in row 320 above. The only difference is that multiple existing service instances are compared when reconciling properties. This situation could occur, for example, if a user has subscribed to multiple offers that all include a specific service. For example, the user could have first subscribed to a webmail account service (outside of any offer or package of services) with a particular Internet service provider (ISP). Later, the user could have purchased a data line subscription (e.g., cable modem or digital subscriber line) through the ISP that also includes the webmail account service. Finally, the user could have enrolled at a university that offers, as a service to its students, computing services including the webmail account service provided by the ISP. The result of this activity would be three service instances for the webmail account service, which could each have different service properties (overlapping service properties). In order to ensure that the user receives the benefit of the best (or most desirable) service properties, the service properties could be reconciled across the three instances and the best value for each property selected as the effective service properties. The effective service properties would then be applied (used for) the webmail account service for the user.

In the example provisioning state diagram 300, the fourth row 340 indicates what tasks and actions are performed when receiving a request to deprovision a service when the service is not currently provisioned for the user (when the initial user state indicates that there are no current service instances for the user). In this situation, no service actions or property actions need to be performed. This row is included in the example provisioning state diagram 300 for completeness, and represents what occurs when receiving a deprovisioning request to deprovision a service instance that is not present.

In the example provisioning state diagram 300, the fifth row 350 indicates what tasks and actions are performed when receiving a request to deprovision a service (a deprovisioning request) when one instance of the service is currently provisioned for the user (when the initial user state indicates that there is one current service instances for the user). In this situation, because there is only one instance of the service provisioned for the user, the service will be removed for the user (the Service Action). In addition, the service properties will also be removed because the user is no longer subscribed to the service.

For example, consider a user who had previously subscribed to the WebmailSilverOffer offer (see Section IV above), which includes a one year webmail inbox service. If a year has passed (or if the user indicates a desire to cancel the service), then a deprovisioning request can be received to deprovision the service for the user.

In the example provisioning state diagram 300, the sixth row 360 indicates what tasks and actions are performed when receiving a request to deprovision a service (a deprovisioning request) when multiple instances of the service are currently provisioned for the user (when the initial user state indicates that there are two or more current service instances for the user). In this situation, the service is not removed for the user (the Service Action) because at least one service instance will remain after the deprovisioning event (the user will still be a subscriber to the service). However, once a service instance has been removed according to the deprovisioning event (e.g., the deprovisioning event can indicate an identifier for the specific instance to be deprovisioned), service properties for the remaining service instances will be reconciled (the Property Action).

For example, consider a user that is currently subscribed to the WebmailSilverOffer offer (see Section IV above), which includes the Service100 webmail service, and currently subscribed to the Service100 webmail service (e.g., WebmailSeparate, not part of an offer) and thus has two instances of the Service100 service provisioned. If the user then decides to cancel the WebmailSilverOffer offer, this state (row 360) would apply. The service instance for Service100 corresponding to the WebmailSilverOffer offer would be removed, and the service properties of the remaining instance would be reconciled. In this situation, the properties of the one remaining service instance would be the new effective service properties (the WebmailSeparate properties, which include a 5 GB inbox). Importantly, the user's webmail service (Service100) is not completely removed when the user cancels the WebmailSilverOffer offer while the user still maintains subscriptions to other offers that include the service (Service100) or the user is directly subscribed to the service. Instead, the service properties of the remaining service instances are reconciled (e.g., the user may receive a reduced level of service, such as a 5 GB inbox instead of a 10 GB inbox).

VI. Example Reconciling Properties

In general, service properties need to be reconciled in order to determine which properties to apply (to use) for a particular service for a particular user. When there is only one instance of a particular service (e.g., when provisioning a service for a user where the service has not been provisioned previously for that user), reconciliation is straightforward (e.g., just apply the new service properties). However, where one or more service instances already exist, and another instance of the service is to be provisioned for the user, reconciling service properties between the new instance and the existing (or current) instances can be more difficult. Similarly, where multiple service instances exist, and one of the instances is to be deprovisioned for the user, reconciling service properties between the remaining instances can be more difficult.

In a specific implementation, an algorithm represented by the following pseudo code is used to reconcile service properties to determine effective service properties. For example, the algorithm can be implemented by a service provisioning system (e.g., by the service provisioning system depicted in FIG. 1 or the service syndication system depicted in FIG. 6). The algorithm can be implemented when a provisioning event occurs (e.g., upon receiving a request to provision or deprovision a service for a user), such as when changing state as indicated in the provisioning state diagram depicted in FIG. 3.

```
// Pseudo code of example algorithm to determine effective
service properties
For each Service in all current Offers for the user (from the
Provisioning State db)
Begin-For
    PropertyList = empty
    For each Property for Service.current (from the Offer Data db)
    Begin-For
        If Property.current not present in PropertyList then
            add Property.current to PropertyList
        End-if
        Else
            // Property.current is present in PropertyList
            If Property.current.Weight > PropertyList.property.Weight
            then
                Set PropertyList.property.Value to
                    Property.current.Value
            End-if
        End-Else
    End-For // for each Property
    Set ServiceProperties.new to PropertyList
End-For // for each Service
// ServiceProperties.new ready here to be sent to service provider as
// new effective service properties or updated effective service
properties
```

As illustrated by the above pseudo code, a list of effective service properties (PropertyList in the pseudo code) are determined for each service that the user is subscribed to (each service for which the user has one or more service instances). The effective service properties are created, in the above pseudo code, by adding properties that are not already present and otherwise including the property value with the greater weight (e.g., reflecting the value that provides the best relative level of service). The resulting effective service properties are then sent, according to the above pseudo code, to the service provider that is providing the service.

VII. Example Methods for Provisioning Services

Figure 2:
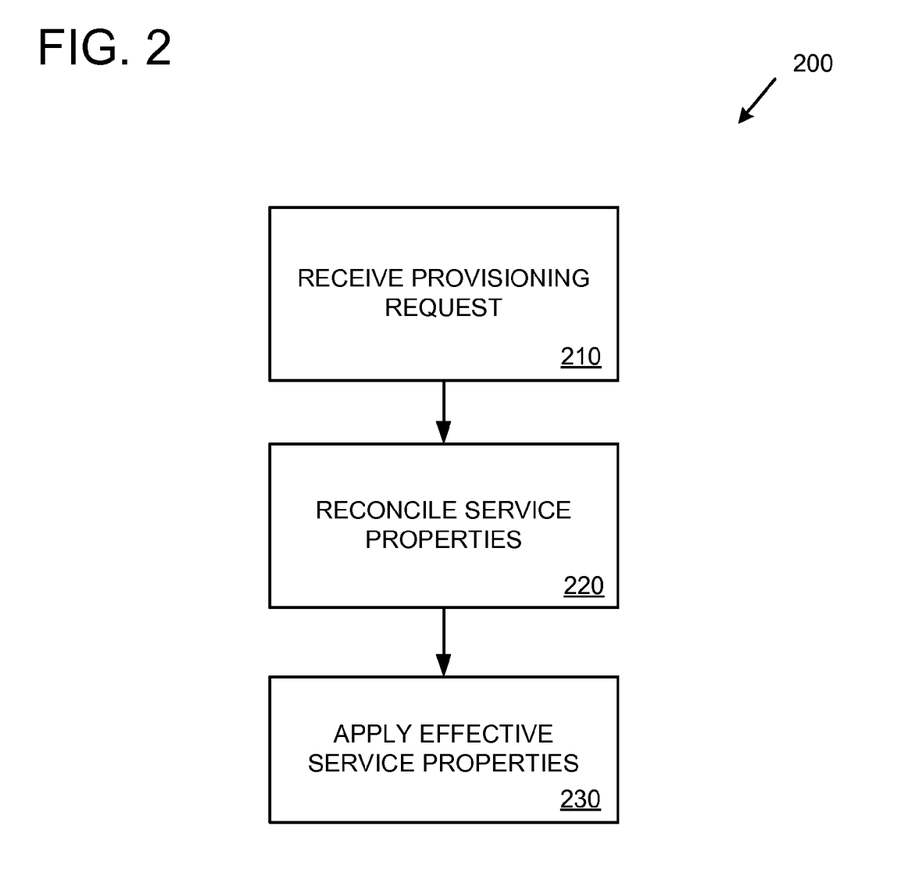
FIG. 2 is a flowchart showing an exemplary method for provisioning services and reconciling service properties.
Figure 6:
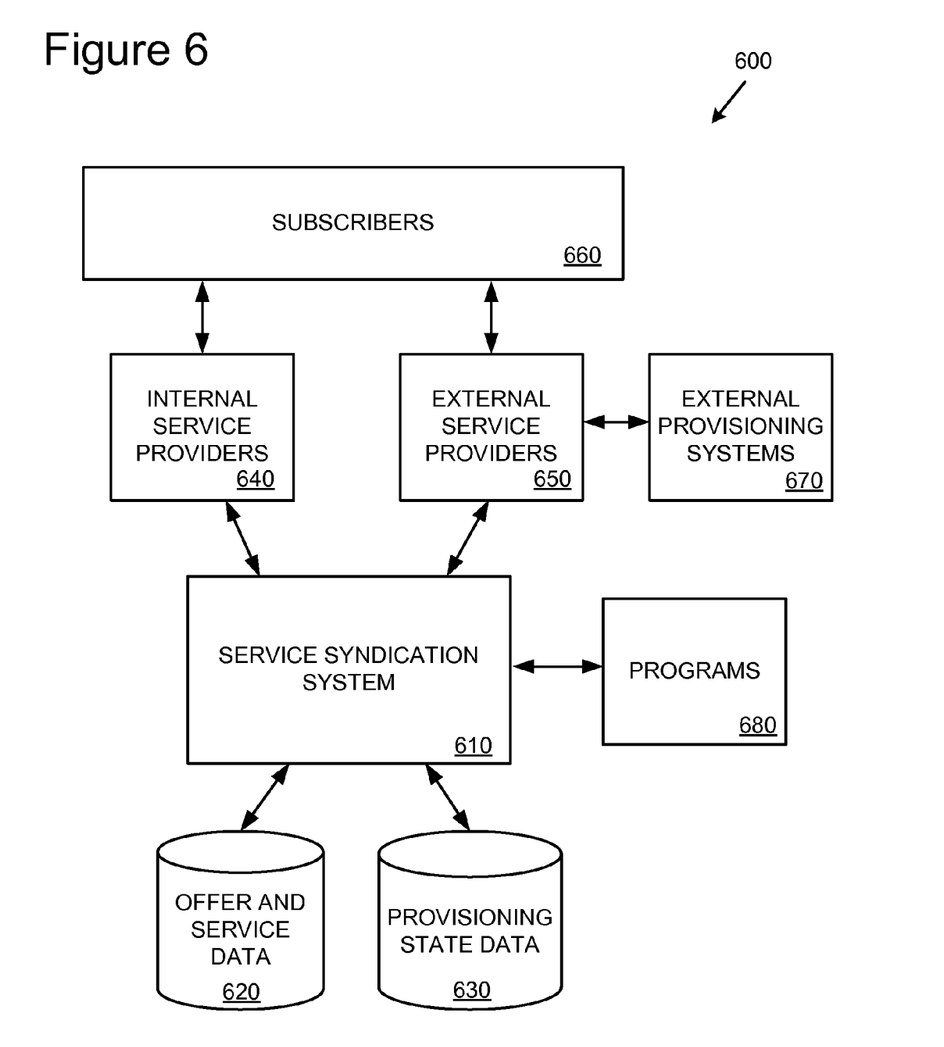
FIG. 6 is a diagram showing an exemplary service syndication environment.

FIG. 2 shows an exemplary method 200 for provisioning services using, at least in part, a service provisioning system (e.g., the service provisioning system depicted in FIG. 1 or the service syndication system depicted in FIG. 6).

At 210, a provisioning request is received (e.g., received by a service provisioning system from a program, such as a go-to-market program, a reseller, etc.). The provisioning request comprises a request to provision a service (e.g., represented by a unique service identifier) for a user (e.g., represented by a unique user identifier). In addition, the provisioning request includes new service properties for the service. An example of a provisioning request is a request to provision a webmail service (e.g., Service100) for a specific user (e.g., User1234) and including specific service properties (e.g., an Inbox property with a value of "20 GB" and a weight of "100", and an Expire property with a value of "Never" and a weight of "100"). The provisioning request can be received as part of a request to provision an offer comprising multiple services, or as a provisioning request to provision the individual service.

At 220, service properties are reconciled to determine effective service properties. For example, the new service properties from the provisioning request 210 can be reconciled with current service properties. In some implementations, the reconciling comprises obtaining service properties for one or more previously provisioned instances of the service for the user (e.g., obtained by querying for the current service properties from a provisioning state database based on the user identifier) and, based on the obtained current service properties and the new service properties, determining the effective service properties for the service.

At 230, the effective service properties are applied. The effective service properties are those that will be used by the service provider when providing the service for the user.

In some implementations, reconciling service properties to determine effective service properties comprises comparing values for the same property from multiple service instances using relative weights to determine which property value represents the best relative level of service.

Figure 4:
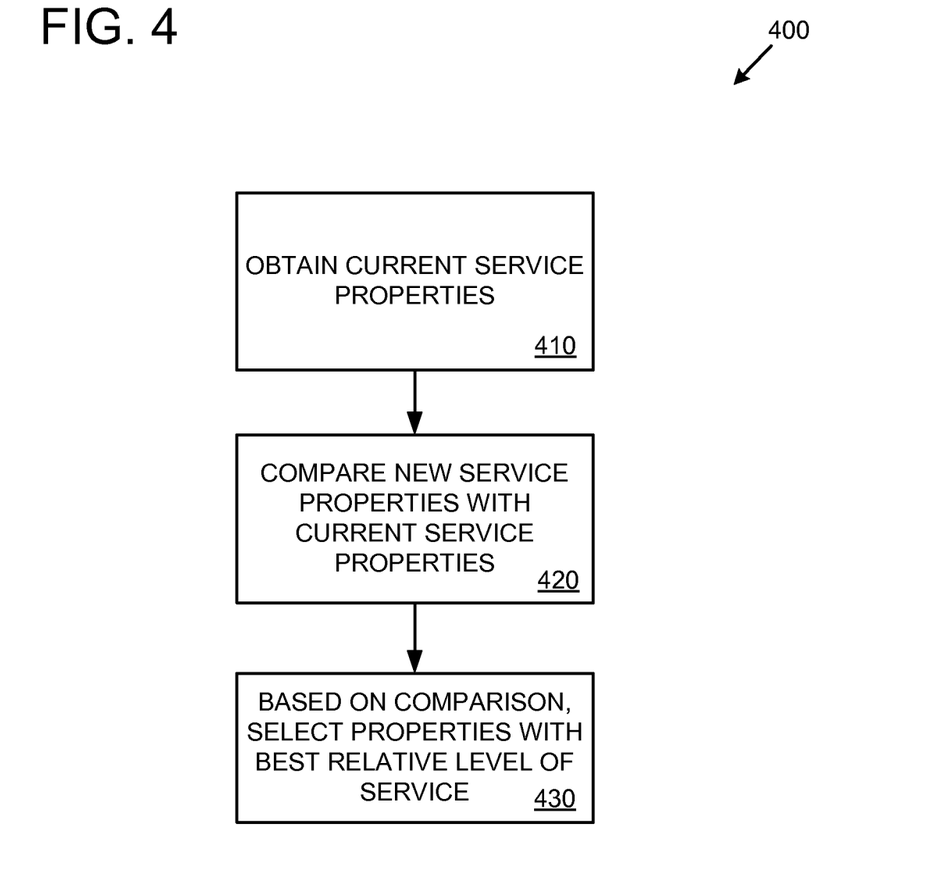
FIG. 4 is a flowchart showing an exemplary method for reconciling service properties.

FIG. 4 shows an exemplary method 400 for reconciling service properties. The example method 400 can be performed when receiving a provisioning request in order to determine effective service properties to apply for a service for a user.

At 410, current service properties are obtained. For example, current service properties can be obtained for one or more currently provisioned service instances. The current service properties can be obtained by a service provisioning system from a provisioning state database.

At 420, new service properties are compared with current service properties. For example, new values for service properties (from a provisioning request) can be compared with current values from one or more currently provisioned service instances for the service. Values of each specific service property can be compared to see which value represents the best relative level of service. For example, the comparison can be performed using relative weights associated with the property values.

At 430, the values representing the best relative level of service for each property are selected based on the comparison 420.

For example, consider a new provisioning request to provision a webmail service with an inbox property value of 5 GB and a weight of 40, and current provisioned service instance of the webmail service with an inbox property value of 10 GB and a weight of 60. When the values of the inbox property are compared (by comparing the relative weights of 40 and 60), the inbox property value representing the best relative level of service is selected as an effective property value (in this example, the property value of 10 GB is selected as an effective property value for the inbox property, and the 5 GB property value is not selected and thus not currently applied to the service).

Figure 5:
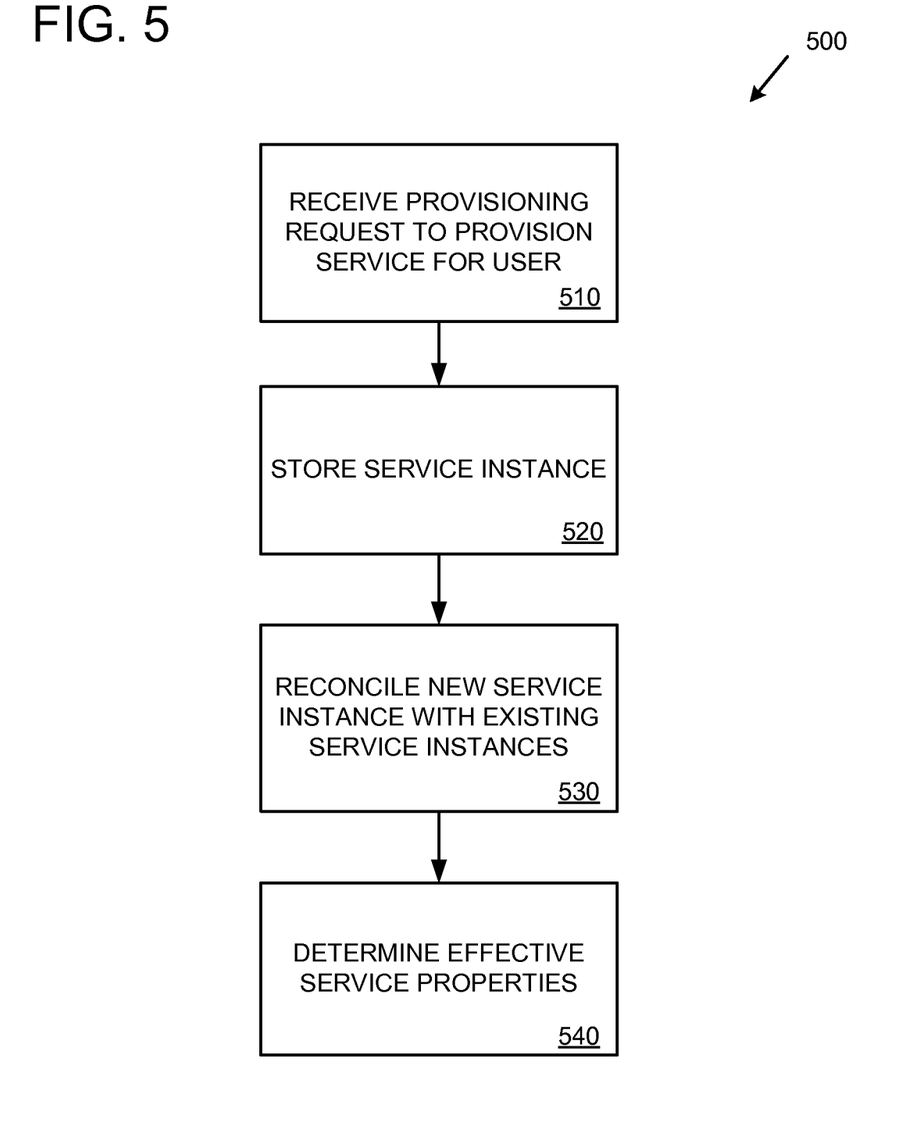
FIG. 5 is a flowchart showing an exemplary method for provisioning services and reconciling service instances.

FIG. 5 shows an exemplary method for provisioning services and reconciling service instances. The example method 500 can be performed when receiving a provisioning request in order to determine effective service properties to apply for a service for a user.

At 510, a provisioning request is received (e.g., received by a service provisioning system from a service provider). The provisioning request comprises a request to provision a service (e.g., represented by a unique service identifier) for a user (e.g., represented by a unique user identifier). In addition, the provisioning request includes new service properties for the service. An example provisioning request is a request to provision a webmail service (e.g., Service100) for a specific user (e.g., User1234) and includes specific service properties (e.g., an Inbox property with a value of "20 GB" and a weight of "100", and an Expire property with a value of "Never" and a weight of "100").

At 520, a new service instance representing the provisioning request 510 is stored. The service instance can comprise a unique service identifier, a unique user identifier, and new service properties. The service instance can also comprise a unique offer identifier. The service instance can be stored in a provisioning state database by a service provisioning system.

At 530, the new service instance 520 is reconciled with one or more existing service instances for the same service. The reconciling is performed to determine effective service properties for the service. In order to reconcile the new and existing service instances, properties of the service instances (which may have different values for the same property) are compared to determine which value represents the best level of service.

At 540, effective service properties are determined based on the reconciling 530. The effective service properties are used (applied) for the service for the user.

VIII. Example Service Syndication Environment

FIG. 6 depicts an exemplary service syndication environment 600. The service syndication environment 600 provides a centralized service provisioning solution for internal service providers 640 and external service providers 650.

A service syndication system 610 (a service provisioning system capable of supporting multiple internal and/or external service providers) provides centralized provisioning, deprovisioning, maintenance, and storage solutions. The service syndication system 610 provides the centralized solutions by supporting various service provisioning operations (e.g., provisioning, deprovisioning, and maintenance service provisioning operations). For example, the service syndication system 610 receives requests (e.g., service provisioning requests) from programs 680 and from internal service providers 640 and external service providers 650. The service syndication system 610 can use various types of computing devices (e.g., server computers, database servers, networking devices, and other types of computing devices) to provide provisioning solutions.

The service syndication system 610 is associated with a data repository storing offer and service data 620. The service and offer data 620 includes information related to offers (e.g., go-to-market offers) and services (e.g., individual services or collections of services related to an offer) as well as service properties. For example, the offer and service data can be stored according to the data schema described in Section IV above.

The service syndication system 610 is also associated with a data repository storing provisioning state data 630. The provisioning state data 630 includes information related to users and their associated service instances. For example, the provisioning state data can be stored according to the data schema described in Section IV above.

Using the service syndication environment 600, internal service providers 640 and external service providers 650 can provide services to their subscribers (users) 660 while utilizing the service syndication system 610 for storage of provisioning information (e.g., offer/service data 620 and provisioning state data 630). In this way, the internal and external service providers (640 and 650) do not have to maintain offer/service data and provisioning state information themselves. Furthermore, the centralized solution of the service syndication system 610 allows subscribers 660 to maintain a consistent identity (e.g., the same user identity or account identity) across multiple service providers.

For example, consider a subscriber (one of the subscribers 660) that signs up for a webmail account service via one of the internal service providers 640 or via one of the programs 680 (e.g., as part of a package of services of a specific go-to-market program). In order to provision the subscriber's webmail service, the internal service provider (or program) would send a provisioning request to the service syndication system 610 to provision the user's webmail service. The service syndication system 610 would use the stored offer and service data 620 to obtain offer and/or service provisioning information (e.g., the service could be the Service100 service of the WebmailSeparate offer, as described in Section IV above). The service syndication system 610 would store the service instance in the provisioning state data store 630. The service syndication system 610 would also reconcile service properties if multiple service instances exist for the service (e.g., for the Service100 service) in the provisioning state data store 630. Once the service syndication system 610 determines effective service properties, it would send the effective service properties to the service provider providing the service (e.g., to the internal service provider providing the Service100 webmail service).

The subscriber could also sign up for other offers that include the same service, which could be centrally provisioned by the service syndication system 610. For example, if the subscriber signs up for the WebmailGoldOffer offer (as described in Section IV above) through one of the external service providers 650 or though one of the programs 680, the external service provider (or program) would send a provisioning request to the service syndication system 610. The service syndication system 610 would use the offer and service data store 620 to obtain information regarding the offer and store one or more provisioning instances (depending on the number of services in the offer) in the provisioning state data store 630. In this example, the service syndication system 610 would store a second service instance for the Service100 service (the first instance was the Service100 instance for the WebmailSeparate offer for the subscriber) using the properties as defined in the WebmailGoldOffer offer. The service syndication system 610 would reconcile the service properties across the two instances of the Service100 service (e.g., the 5 GB and 20 GB inbox property values would be compared using their respective weights and the 20 GB value would be selected as the effective inbox property value). The service syndication system 610 would send updated effective service properties to the service provider in charge of the Service100 webmail service (in this example, to one of the internal service providers 640).

The service syndication environment 600 also supports external provisioning systems 670. Supporting external service provisioning systems 670 allows service providers (e.g., external service providers 650) to use a provisioning solution other than the service syndication system 610 for provisioning, but still use the service syndication system 610 for storage of provisioning information and reconciliation of service properties. For example, an external service provider 650 could provision a service for a subscriber 660 using an external provisioning system 670 and store (e.g., via a provisioning state update application programming interface (API)) the service instance at the service syndication system 610. Instances of the same service could also be provisioned directly via the service syndication system 610. Instances from both paths (those coming from external provisioning systems and those coming internally) can be centrally stored and reconciled at the service syndication system 610.

IX. Example Computing Environment

Figure 7:
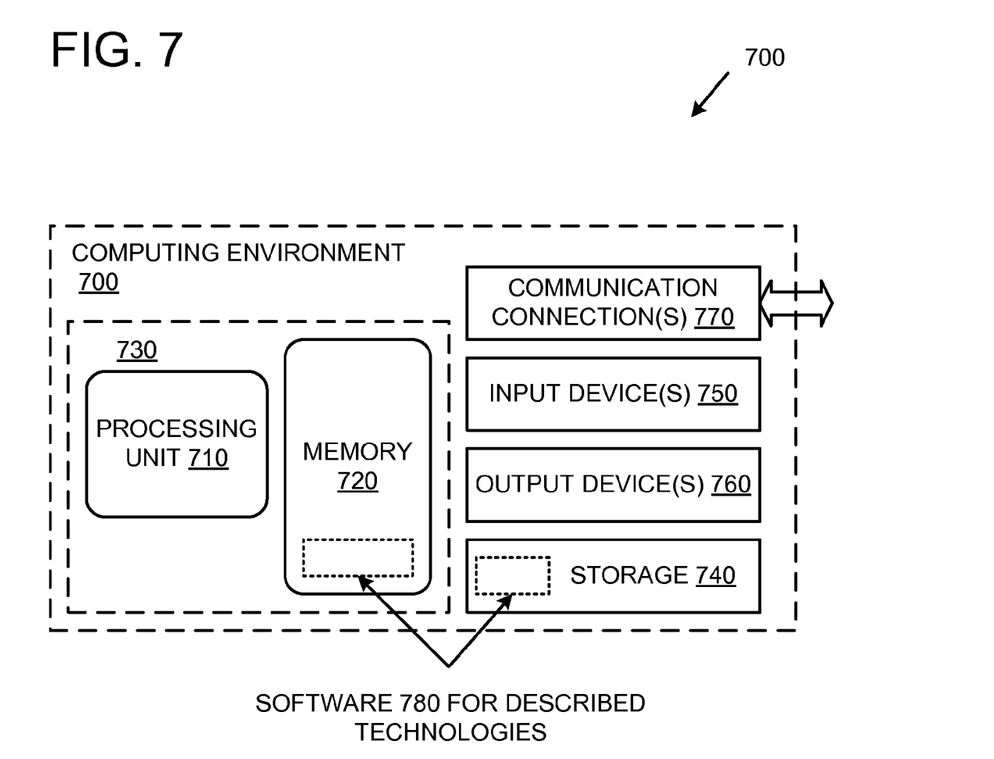
FIG. 7 is a block diagram illustrating an example of a computing environment that can be used to implement any of the technologies described herein.

FIG. 7 illustrates a generalized example of a suitable computing environment 700 in which described embodiments, techniques, and technologies may be implemented. For example, the computing environment 700 can be one of the computing devices (e.g., a computer server) used to operate the service provisioning system 110 or the service syndication system 610.

The computing environment 700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, the computing environment 700 includes at least one central processing unit 710 and memory 720. In FIG. 7, this most basic configuration 730 is included within a dashed line. The central processing unit 710 executes computer-executable instructions and may be a real or a virtual processor. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780 that can, for example, implement the technologies described herein. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the software 780, which can implement technologies described herein.

The input device(s) 750 may be a touch input device, such as a keyboard, keypad, mouse, pen, or trackball, a voice input device, a scanning device, or another device, that provides input to the computing environment 700. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 700. By way of example, and not limitation, with the computing environment 700, computer-readable media include memory 720, storage 740, communication media (not shown), and combinations of any of the above.

Computer-readable media are any available media that can be accessed within a computing environment 700. By way of example, and not limitation, with the computing environment 700, computer-readable media include memory 720 and/or storage 740. As should be readily understood, the term computer-readable storage media includes the media for data storage such as memory 720 and storage 740, and not transmission media such as modulated data signals.

X. Example Implementation Environment

Figure 8:
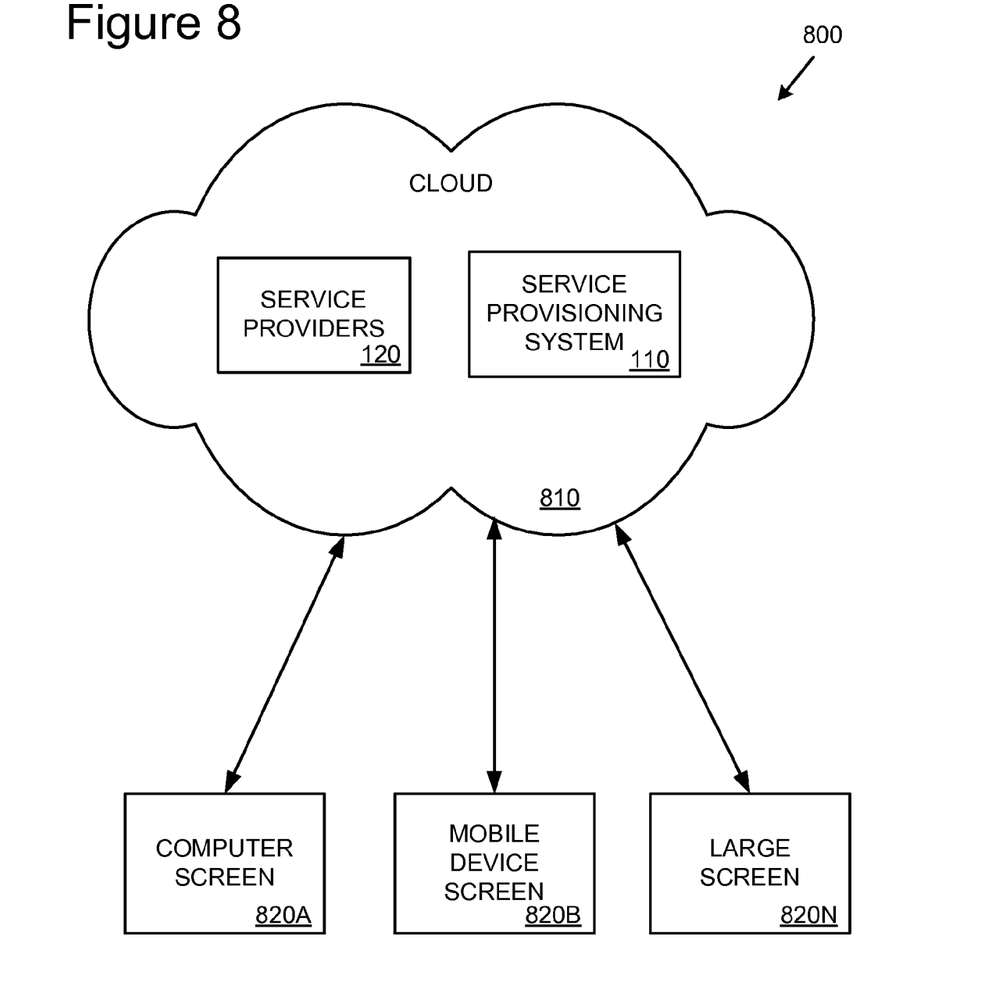
FIG. 8 is a block diagram illustrating an example of an implementation environment in which the technologies described herein can be utilized.

FIG. 8 illustrates a generalized example of a suitable implementation environment 800 in which described embodiments, techniques, and technologies may be implemented.

In example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet.

In example environment 800, the cloud 810 provides services for connected devices with a variety of screen capabilities 820A-N. Connected device 820A represents a device with a computer screen (e.g., a mid-size screen). For example, connected device 820A could be a personal computer such as desktop computer, laptop, notebook, netbook, or the like. Connected device 820B represents a device with a mobile device screen (e.g., a small size screen). For example, connected device 820B could be a mobile phone, smart phone, personal digital assistant, tablet computer, and the like. Connected device 820N represents a device with a large screen. For example, connected device 820N could be a television screen (e.g., a smart television) or another device connected to a television (e.g., a set-top box or gaming console) or the like.

Services can be provided by the cloud 810 through service providers 120, or through other providers of online services (not depicted). For example, cloud services can be customized to the screen size and/or display capability of the particular connected device (e.g., connected devices 820A-N).

In example environment 800, the cloud 810 provides the provisioning solutions described herein to the various connected devices 820A-N using, at least in part, the service provisioning system 110. For example, the service provisioning system 110 can provide a centralized service provisioning solution for various cloud-based services (e.g., cloud-based services provided by various service providers, such as service providers 120). The service provisioning system 110 can manage service subscriptions for users and/or devices (e.g., for the connected devices 820A-N and/or their respective users).

Instead of, or in addition to, the service providers 120 and the service provisioning system 110, services and provisioning solutions can be provided by the cloud using the service syndication environment 600.

XI. Example Alternatives and Combinations

The service provisioning techniques and solutions described in this application can be used in various combinations to provide more efficient management of service instances, including service instances for overlapping services.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method, implemented at least in part by a service provisioning system, for provisioning services for users, the method comprising:
   receiving, by the service provisioning system, a provisioning request, wherein the provisioning request comprises a request to provision a service, represented by a service identifier, for a user, represented by a user identifier, and wherein the provisioning request further comprises new service properties for the service;
   reconciling, by the service provisioning system, the new service properties for the service with current service properties for the service, wherein the reconciling comprises:
   obtaining, by the service provisioning system, the current service properties for one or more previously provisioned instances of the service for the user; and
   based on the obtained current service properties and the new service properties, determining, by the service provisioning system, effective service properties for the service, wherein the service provisioning system supports determining the effective service properties that include at least one of the current service properties and at least one of the new services properties, wherein the determining the effective service properties comprises:
for one or more overlapping service properties in the new service properties and the current service properties:
identifying which value of the overlapping service property represents a best relative level of service; and
adding the identified value and the overlapping service property as one of the effective service properties; and
applying, by the service provisioning system, the effective service properties as properties to use for the service for the user.

2. The method of claim 1 wherein the applying the effective service properties for the service comprises storing, by the service provisioning system, the effective service properties in a database.

3. The method of claim 1 wherein the determining the effective service properties for the service further comprises:
comparing a new value for a service property from the new service properties with a current value for the service property from the current service properties to identify which of the new value and the current value represents the best relative level of service; and
based on the comparison, selecting the value, and its corresponding property, identified as representing the best relative level of service as an effective service property.

4. The method of claim 3 wherein the new value for the service property is associated with a first relative weight, wherein the current value for the service property is associated with a second relative weight, and wherein the comparing the new value for the service property with the current value for the service property comprises comparing the first relative weight and the second relative weight.

5. The method of claim 1 wherein the service provisioning system provides provisioning services, and centralized storage of service instances, for a plurality of internal service providers and a plurality of external service providers.

6. The method of claim 1 further comprising: receiving, by the service provisioning system, a second provisioning request, wherein the second provisioning request comprises a request to deprovision the service for the user;
removing, by the service provisioning system, an instance of the service representing the new service properties; and
reconciling, by the service provisioning system, the current service properties for the service.

7. The method of claim 1 wherein the service is a webmail account service accessible by the user via the Internet.

8. A method, implemented at least in part by a service provisioning system, for provisioning services for users, the method comprising:
receiving, by the service provisioning system, a provisioning request, wherein the provisioning request comprises a request to provision a service, represented by a service identifier, for a user, represented by a user identifier, and wherein the provisioning request further comprises new service properties for the service;
storing, by the service provisioning system in a provisioning database, a new service instance comprising the service identifier, the user identifier, and the new service properties for the service; and
reconciling, by the service provisioning system, the new service instance with one or more previously stored service instances for the same service to determine effective service properties for the service, wherein the previously stored service instances comprise current service properties, and wherein the determining the effective service properties for the service comprises:
for one or more overlapping service properties in the new service properties and the current service properties:
identifying which value of the overlapping service property represents a best relative level of service; and
adding the identified value and the overlapping service property as one of the effective service properties.

9. The method of claim 8 wherein the provisioning request is part of a request to subscribe the user to an offer, wherein the offer comprises a plurality of services including the service to be provisioned.

10. The method of claim 8 further comprising: receiving, by the service provisioning system, a second provisioning request, wherein the second provisioning request comprises a request to deprovision the service for the user; removing, by the service provisioning system from the provisioning database, the new service instance; and reconciling, by the service provisioning system, the one or more previously stored service instances to determine updated effective service properties for the service.

11. The method of claim 10 further comprising: receiving, by the service provisioning system, a third provisioning request, wherein the third provisioning request comprises a request to deprovision the service for the user; if only one previously stored service instance remains for the service: removing, by the service provisioning system from the provisioning database, the one previously stored service instance; and removing the service for the user; and if more than one previously stored service instance remains for the service: removing, by the service provisioning system from the provisioning database, one of the more than one previously stored service instances corresponding to the third provisioning request; skipping the removing the service for the user; and reconciling, by the service provisioning system, the remaining previously stored service instances to determine updated effective service properties for the service.

12. The method of claim 8 further comprising: receiving, by the service provisioning system, a request to provision an offer for the user, wherein the offer comprises a plurality of services; for each service of the plurality of services of the offer: performing the method of claim 8 to provision the service for the user.

13. A service provisioning system for provisioning services for users, the system comprising:
one or more computing devices; and
one or more data repositories storing offer/service data and provisioning state data; wherein the one or more computing devices are configured for performing service provisioning operations, comprising:
receiving, by the service provisioning system, a provisioning request, wherein the provisioning request comprises a request to provision a service, represented by a service identifier, for a user, represented by a user identifier, and wherein the provisioning request further comprises new service properties for the service;
reconciling, by the service provisioning system, the new service properties for the service with current service properties for the service, wherein the reconciling comprises:
obtaining, by the service provisioning system, the current service properties for one or more previously provisioned instances of the service for the user; and
based on the obtained current service properties and the new service properties, determining, by the service provisioning system, effective service properties for the service, wherein the service provisioning system supports determining the effective service properties that include at least one of the current service properties and at least one of the new services properties, wherein the determining the effective service properties for the service comprises:

for one or more overlapping service properties in the new service properties and the current service properties:

identifying which value of the overlapping service property represents a best relative level of service; and adding the identified value and the overlapping service property as one of the effective service properties; and applying, by the service provisioning system, the effective service properties as properties to use for the service for the user.

14. The service provisioning system of claim 13 wherein the provisioning request is received by the service provisioning system from an external service provider.

15. The service provisioning system of claim 13 further comprising: a plurality of internal service providers; and a plurality of external service providers; wherein the service provisioning system stores offer/service data and provisioning state data for the plurality of internal service providers and the plurality of external service providers, and wherein the service provisioning system provides a centralized service syndication solution for the plurality of internal service providers and the plurality of external service providers.

16. The service provisioning system of claim 13 wherein the determining the effective service properties for the service further comprises: comparing a new value for a service property from the new service properties with a current value for the service property from the current service properties to identify which of the new value and the current value represents the best relative level of service; and based on the comparison, selecting the value, and its corresponding property, identified as representing the best relative level of service as an effective service property.

17. The service provisioning system of claim 16 wherein the new value for the service property is associated with a first relative weight, wherein the current value for the service property is associated with a second relative weight, and wherein the comparing the new value for the service property with the current value for the service property comprises comparing the first relative weight and the second relative weight.

18. The method of claim 1 further comprising:

receiving, by the service provisioning system, a second provisioning request, wherein the second provisioning request comprises a request to deprovision one of the one or more previously provisioned instances of the service for the user; removing, by the service provisioning system, the deprovisioned instance of the service; and reconciling, by the service provisioning system, remaining service properties comprising current service properties for any remaining previously provisioned instances of the one or more previously provisioned instances and the new service properties, wherein the reconciling comprises:

obtaining, by the service provisioning system, the remaining service properties; and based on the remaining service properties, determining, by the service provisioning system, the effective service properties for the service; and applying, by the service provisioning system, the effective service properties as properties to use for the service for the user.

\* \* \* \* \*